United States Patent [19]

Cataldo

[11] Patent Number: 4,597,304

[45] Date of Patent: Jul. 1, 1986

[54] MULTI-SPEED POWER TRANSMISSION

[75] Inventor: Roy S. Cataldo, Birmingham, Mich.

[73] Assignee: General Motors Corporation, Detroit, Mich.

[21] Appl. No.: 658,525

[22] Filed: Oct. 9, 1984

[51] Int. Cl.$^4$ ............................................. F16H 3/02
[52] U.S. Cl. ..................................... 74/329; 74/325; 74/331
[58] Field of Search ......................... 74/325, 329, 331

[56] References Cited

U.S. PATENT DOCUMENTS

| | | | |
|---|---|---|---|
| 1,981,236 | 11/1934 | Logue | 74/329 X |
| 3,080,767 | 3/1963 | Price, Jr. | 74/331 X |
| 3,126,752 | 3/1964 | Bolster | 74/331 X |
| 3,318,167 | 5/1967 | Frost | 74/331 |
| 3,893,345 | 7/1975 | Sisson et al. | 74/331 |
| 4,392,391 | 7/1983 | Jameson et al. | 74/331 X |
| 4,458,551 | 7/1984 | Winter-Peter | 74/331 X |
| 4,464,947 | 8/1984 | Windsor-Smith et al. | 74/329 |
| 4,476,737 | 10/1984 | Young | 74/329 X |

FOREIGN PATENT DOCUMENTS

| | | | |
|---|---|---|---|
| 59-40046 | 3/1984 | Japan | 74/325 |
| 2036892 | 7/1980 | United Kingdom | 74/331 |

Primary Examiner—Lawrence J. Staab
Assistant Examiner—Dwight G. Diehl
Attorney, Agent, or Firm—Donald F. Scherer

[57] ABSTRACT

A multi-speed power transmission has an input shaft and a coaxially aligned output shaft. Each shaft has gearing members connected thereto. The input gearing drives an idler gear which, in turn, drives a ratio gear. A plurality of meshing ratio and idler gears rotatably supported on parallel shafts are serially driven from the input gearing. The shaft supporting each ratio gear has a selectively engageable clutch mechanism for selectively connecting the respective ratio gear shaft with an output gear member. The respective output gear members are in constant mesh with the output gearing member.

3 Claims, 9 Drawing Figures

MULTI-SPEED POWER TRANSMISSION

This invention relates to power transmissions and more particularly to multi-speed power transmissions wherein a plurality of gear ratios are disposed between the input and output shafts of the transmission.

It is an object of this invention to provide an improved power transmission having a plurality of step ratios wherein successive step ratios utilize the gear ratios of the successively higher speed ratios as components in the lower speed ratio determination.

It is another object of this invention to provide an improved multi-speed power transmission wherein the highest torque ratio is the product of all of the successive lower torque ratios which involve a gear mesh to establish the respective torque ratio.

It is a further object of this invention to provide an improved four-speed power transmission wherein the first speed ratio is the product of the fourth, second and first gear ratios, and the second speed ratio is the product of the fourth and second gear ratios.

These and other objects and advantages of the present invention will be more apparent from the following description and drawings in which.

Figure 1:
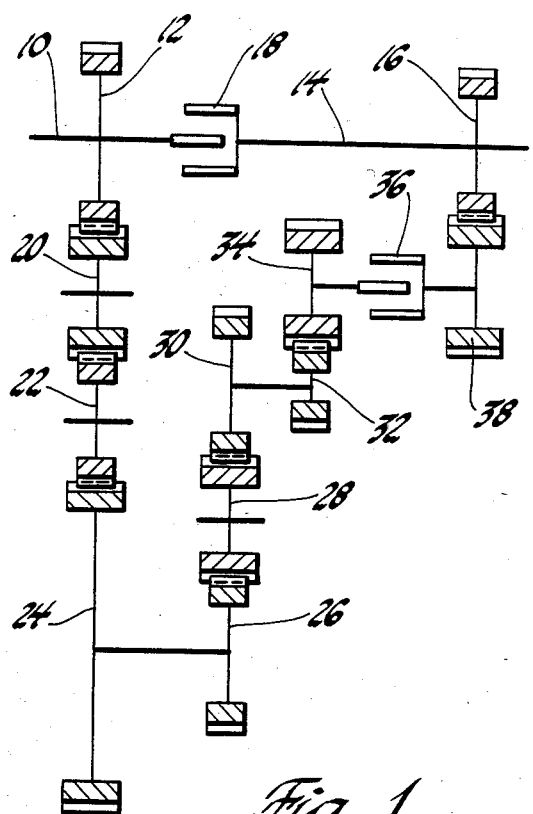
FIGS. 1 through 4 are schematic representations of the first, second, fourth and reverse speed ratios, respectively.

Referring to the drawings, wherein like characters represent the same or corresponding parts throughout the several views, FIGS. 1 through 4 schematically represent the first, second, fourth and reverse speed ratios, respectively. Referring to FIG. 1, in particular, there is shown a transmission input shaft 10 which has drivingly connected therewith an input gear member 12. A transmission output shaft 14 is coaxially aligned with the transmission input shaft 10 and has drivingly connected therewith an output gear member 16. A third ratio clutch 18 is coaxially aligned with the input and output shafts such that engagement thereof provides a direct drive between the input shaft 10 and output shaft 14.

The input gear member 12 meshes with an idler gear 20 which, in turn, meshes with the fourth ratio gear 22. The fourth ratio gear 22 meshes with an idler gear 24 which has rotatably connected therewith an idler gear 26. The idler gear 26 meshes with a second ratio gear 28 which, in turn, meshes with an idler gear 30. The idler gear 30 is rotatably connected with an idler gear 32 which meshes with a first ratio gear 34. The first ratio gear 34 is drivingly connected to one portion of a selectively engageable first ratio clutch 36. The first ratio clutch 36 is also drivingly connected to a first ratio output gear 38 which meshes with the output gear member 16 which, as aforementioned, is drivingly connected to the transmission output shaft 14.

The overall drive ratio or speed ratio from the input shaft 10 to the output shaft 14 is proportional to the product of the ratio between gears 12 and 22, the ratio between gears 22 and 28 and the ratio between gears 28 and 34. If desirable, the ratio between gears 38 and 16 can also be utilized to affect the first or lowest speed ratio of the transmission. By way of example, the input gear 12 has twenty-two teeth, gears 20, 22, 28 and 34 each have fifteen teeth, gear 24 has forty teeth, gear 26 has seventeen teeth, gear 30 has eighteen teeth, and gear 32 has ten teeth. With these gear members, the first speed ratio, existing between shaft 10 and clutch 36, will be 2.88 which is the product of:

0.68×2.35×1.8

The fourth gear ratio represented by gears 12 and 22 is 0.68. The ratio between gears 22 and 28 is 2.35 and the ratio between gears 28 and 34 is 1.8. Thus, when clutch 36 is engaged, the first speed ratio between shaft 10 and gear 38 will be 2.88.

Figure 2:
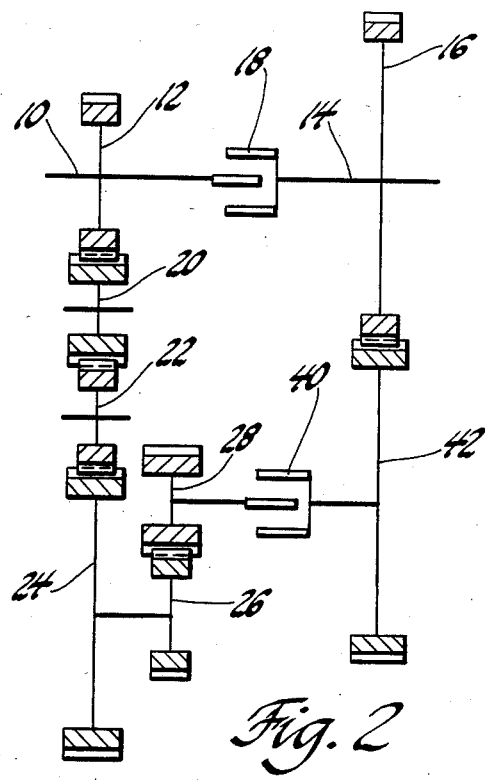

FIG. 2 represents the gearing coacting to establish the second speed ratio which includes input gear 12, idler gear 20, fourth ratio gear 22, idler gears 24 and 26, and second ratio gear 28. The second ratio gear 28 is drivingly connected to a selectively engageable second ratio clutch 40 which is also drivingly connected to a second ratio output gear 42 which, in turn, meshes with the output gear member 16. The second speed ratio is equal to the product of the fourth gear ratio (0.68) times the ratio between gears 22 and 28 (2.35). The second speed ratio in this particular instance is equal to 1.60. In other words, the input shaft 10 rotates 1.60 times for each rotation of gear 42. The second gear ratio can be further affected by the ratio between gears 42 and 16.

Figure 3:
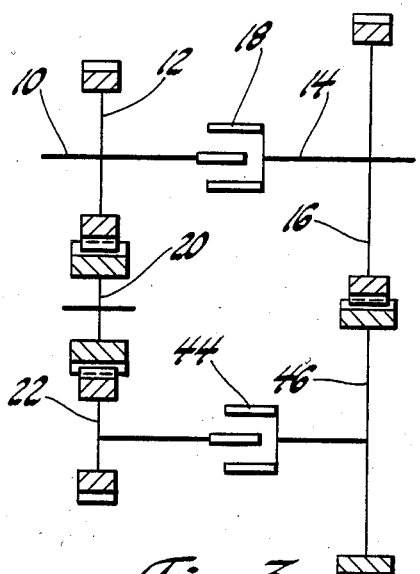

The fourth speed ratio is depicted in FIG. 3. Only those gearing components from FIG. 1 necessary for the establishment of the fourth speed ratio are shown. The fourth speed ratio is established between the input shaft 10 and the output shaft 14 by the engagement of a selectively engageable fourth ratio clutch 44 which is drivingly connected between the fourth ratio gear 22 and a fourth ratio output gear 46 which meshes with the output gear 16. The fourth speed ratio is equal to the ratio between gears 12 and 22 which is 068. This, of course, is an overdrive ratio. As with the other speed ratios, the ultimate speed ratio between shafts 10 and 14 can be affected by the gear ratio between gears 46 and 16.

Figure 4:
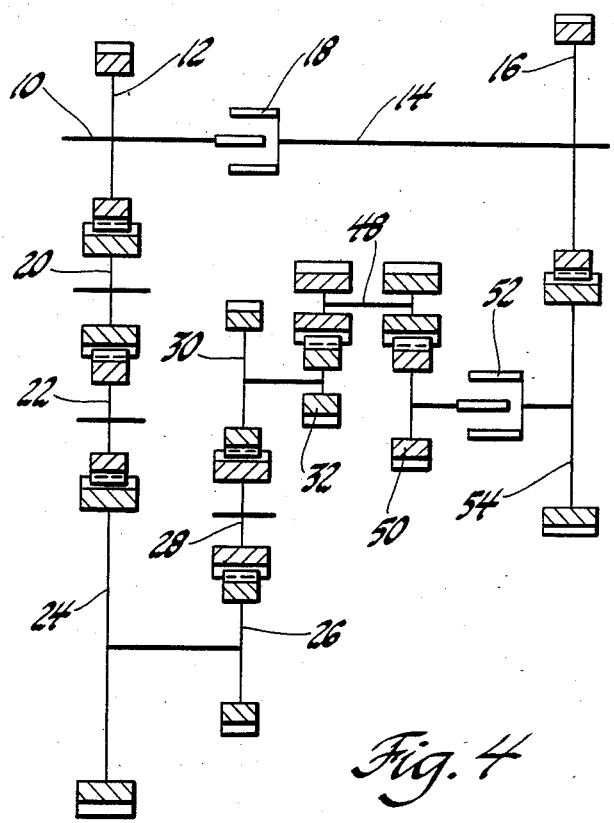

FIG. 4 depicts the gearing which is utilized to establish the reverse speed ratio. It utilizes a number of the same gears which are used in the forward drive ratios, namely, input gear 12, idler gears 20, 24, 26, 30 and 32 and ratio gears 22 and 28. A reverse idler gear cluster 48 meshes between idler gear 32 and a reverse ratio gear 50. The reverse ratio gear 50 is drivingly connected to a selectively engageable reverse clutch 52 which is also connected with a reverse output gear 54. The reverse output gear 54 meshes with output gear 16. The reverse speed ratio can be identical to the first speed ratio by making the number of teeth on gear 50 equal to the number of teeth on gear 34 and by making the reverse idler gear cluster 48 with the same number of teeth meshing with each of gears 32 and 50. The reverse ratio can be affected by varying the teeth on the cluster gear 48. Those skilled in the art will readily recognize the possibilities which are available through the use of varying the number of teeth on each end of cluster gear 48.

The clutches 18, 36, 40, 44 and 52 are conventional selectively engageable clutches and may be hydraulically, electrically, pneumatically, or mechanically engaged and disengaged. The clutches are controlled such that only one clutch is engaged at a time.

Figure 5:
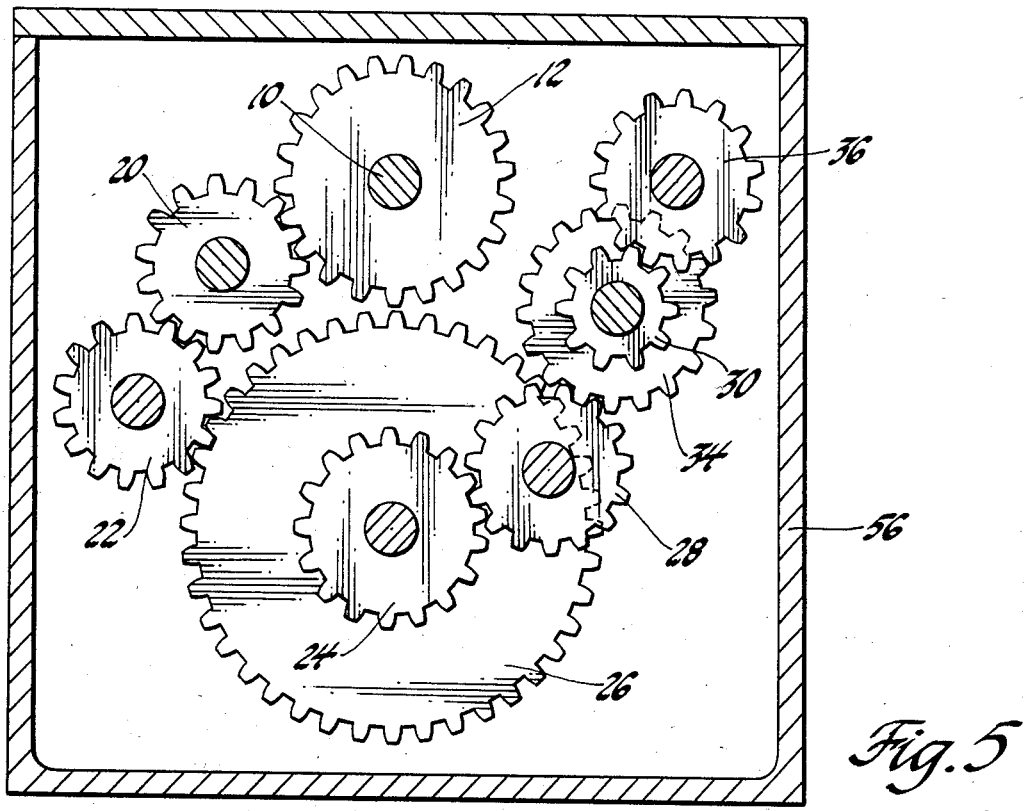
FIG. 5 is a diagrammatic representation of the input, ratio and idler gear members.
Figure 6:
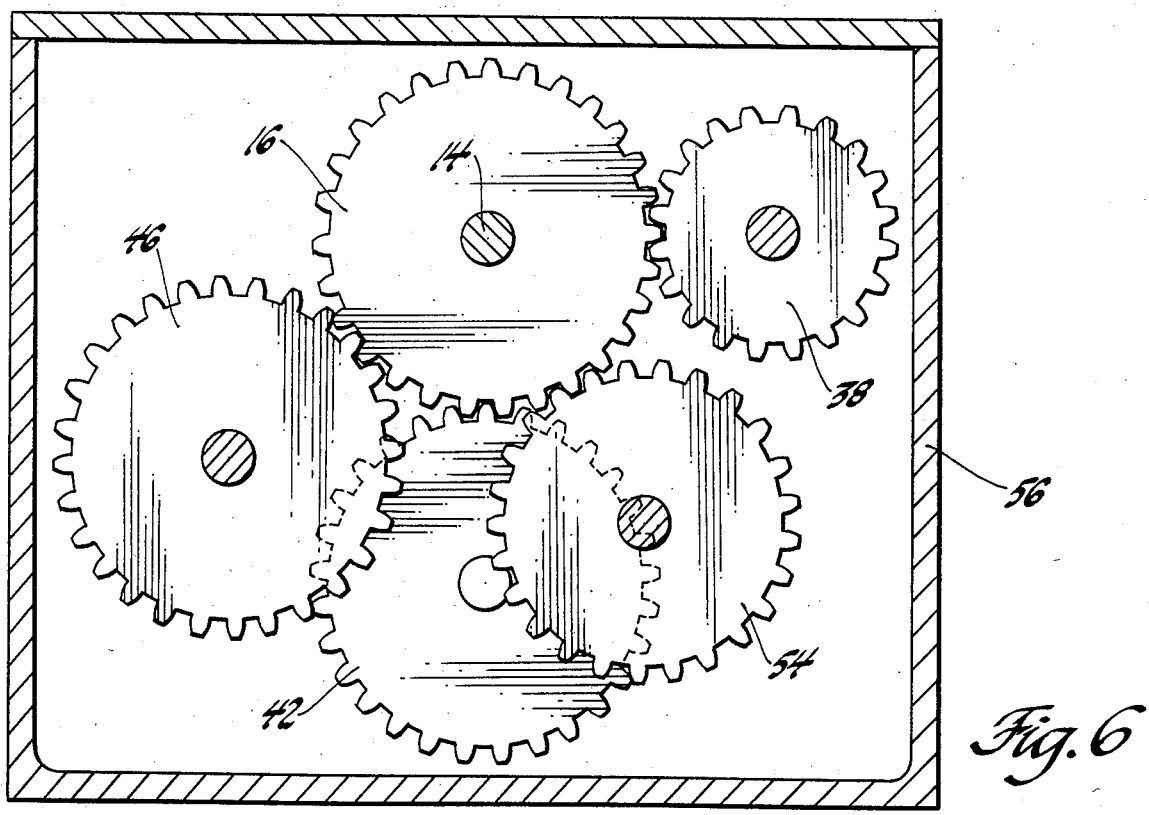
FIG. 6 is a diagrammatic representation of a plurality of the output gear members.
Figure 7:
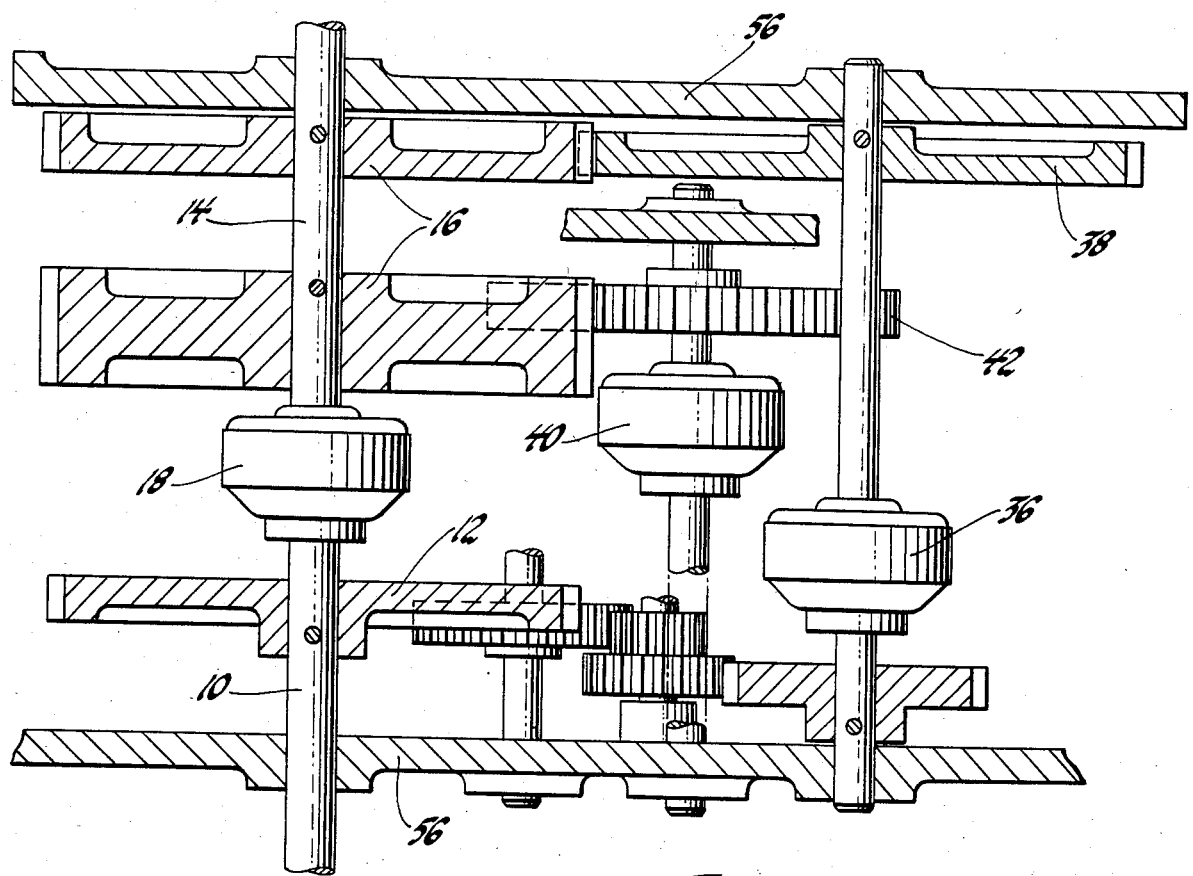
FIG. 7 is a diagrammatic representation showing the first, second and third speed ratio clutches and portions of the gearing connected thereto.

FIG. 5 shows a layout of the gearing as it might appear from an end view of a transmission disposed in a casing 56. FIG. 6 shows a view of the output gearing as it might appear from an end view of a transmission disposed in casing 56. FIG. 7 shows the disposition of the first ratio clutch 36, the second ratio clutch 40 and the third ratio clutch 18 with their respective shafting and some of the gears connected therewith. The clutch shafting is rotatably supported in the transmission case 56. The components in this view have been rotated from their operating positions in an effort to make the drawing more readable. FIG. 7 also shows a slightly modified embodiment in which the output gearing 16 is comprised of two members both of which are secured to the output shaft 14.

Figure 8:
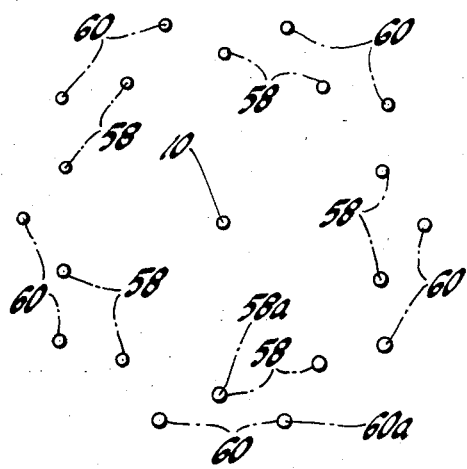
FIG. 8 is a diagrammatic representation of an alternative embodiment of the invention showing the input axis, the idler gear axes and the ratio gear axes.
Figure 9:
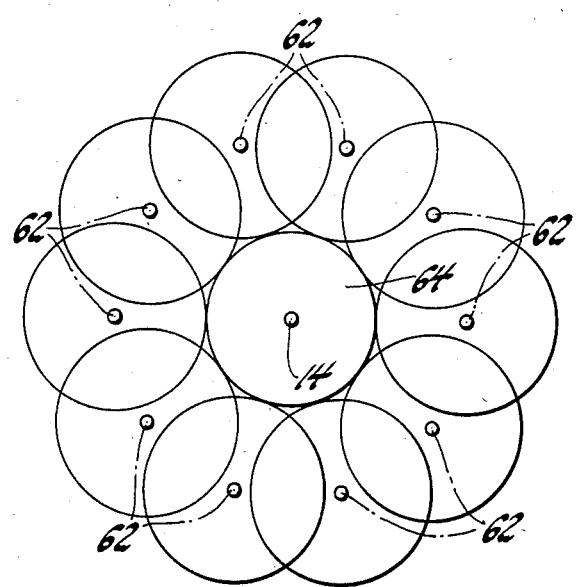
FIG. 9 is a diagrammatic representation of the axes of the output gearing used with the alternate embodiment shown in FIG. 8.

FIGS. 8 and 9 show an alternate embodiment of the present invention wherein ten idler gear axes 58 are disposed about the axis of input shaft 10 and ten ratio gear axes 60 are disposed about the axis of input shaft 10. The power flow in this transmission is from input shaft 10 through an idler on axis 58a, through a ratio gear on axis 60a and then alternately through successive idler gears on axes 58 and ratio gears on axes 60 until the desired speed ratio is reached. Each ratio gear has a clutch member connected thereto for completing the power path to the output gearing shown in FIG. 9. This particular layout will permit ten distinctly geared speed ratios to be utilized.

FIG. 9 shows the layout of the output gearing used with the ratio gearing of FIG. 8. Each ratio gear axis 60 has aligned therewith an output gear axis 62. Each output axis 62 has a gear mounted thereon which meshes with the transmission output gearing 64. As described above, a selectively engageable clutch mechanism is provided to selectively connect individual ratio gears with the respective output gears. Since a direct clutch can also be utilized between shafts 10 and 14, a total of eleven speed ratios can be established with the configuration of the embodiment described in FIGS. 8 and 9.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A power transmission having an input shaft; an output shaft; input gear means drivingly connected with said input shaft; output gear means connected to said output shaft; a plurality of idler gear means; a plurality of ratio gear means, said idler gear means and said ratio gear means being alternately interconnected in meshed relation in series drive arrangement, one of said idler gear means being drivingly connected with said input gear means; selectively engageable clutch means individually connecting respective ones of said ratio gear means with said output gear means and selectively establishing a plurality of drive ratios between said input and output shafts with the highest torque ratio being transmitted through all of said ratio and idler gear means, and the lowest torque ratio being transmitted through only one of said idler gear means and one of said ratio gear means.

2. A power transmission having an input shaft; an output shaft; input gear means drivingly connected with said input shaft; output gear means connected to said output shaft; a plurality of idler gear means; a plurality of ratio gear means alternately interconnected in meshed relation with said idler gear means in series drive arrangement, one of said idler gear means being drivingly connected with said input gear means; selectively engageable clutch means for individually connecting respective ones of said ratio gear means with said output gear means selectively establishing a plurality of drive ratios between said input and output shafts with the lowest speed ratio being transmitted through all of said ratio and idler gear means, and the highest speed ratio being transmitted through only one of said idler gear means and one of said ratio gear means, each of said idler gear means and ratio gear means being disposed on respective axis which are radially offset from the input gear and angularly offset from each other.

3. A power transmission having an input shaft; an output shaft; input gear means drivingly connected with said input shaft; output gear means connected to said output shaft and including a plurality of gear means radially offset from and angularly disposed about said output shaft; a plurality of idler gear means; a plurality of ratio gear means alternately interconnected in meshed relation with said idler gear means in series drive arrangement and angularly disposed about said input shaft, one of said idler gear means being drivingly connected with said input gear means; selectively engageable clutch means individually connecting respective ones of said ratio gear means and with said output gear means selectively establishing a plurality of drive ratios between said input and output shafts with the highest torque ratio being transmitted through all of said ratio and idler gear means, and the lowest torque ratio being transmitted through only one of said idler gear means and one of said ratio gear means; and a direct clutch means for selectively connecting the input and output shafts to the exclusion of all of said idler gear means and ratio gear means.

* * * * *